(12) United States Patent
Nagura

(10) Patent No.: US 8,735,801 B2
(45) Date of Patent: May 27, 2014

(54) OPTICAL ENCODER

(75) Inventor: Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 13/183,356

(22) Filed: Jul. 14, 2011

(65) Prior Publication Data

US 2012/0018626 A1 Jan. 26, 2012

(30) Foreign Application Priority Data

Jul. 20, 2010 (JP) ................................ 2010-163185

(51) Int. Cl.
G01D 5/34 (2006.01)

(52) U.S. Cl.
USPC .................................................... 250/231.13

(58) Field of Classification Search
USPC ................. 250/231.13–231.18; 356/616–619
See application file for complete search history.

(56) References Cited

U.S. PATENT DOCUMENTS

| | | | | |
|---|---|---|---|---|
| 5,981,942 A | * | 11/1999 | Ieki | ......................... 250/231.16 |
| 7,608,813 B1 | | 10/2009 | Milvich et al. | |
| 2004/0262498 A1 | | 12/2004 | Shichi et al. | |

FOREIGN PATENT DOCUMENTS

JP 2009-198318 A 9/2009

OTHER PUBLICATIONS

Extended European Search Report (EESR), for European Application No./Patent No. 11172977.8-1558/2410298, dated Oct. 17, 2013.

* cited by examiner

*Primary Examiner* — Thanh Luu
(74) *Attorney, Agent, or Firm* — Canon USA Inc. IP Division

(57) ABSTRACT

In order to reduce an error component of a detected waveform and enable high-accuracy position detection, there is provided an optical encoder, in which a transmittance distribution or a reflectance distribution provided in a scale track in a displacement scale has a first modulation period and a second modulation period in a scale displacement direction, the light receiving element array is arranged to detect a first signal group including two-phase signals, relative phases of which are reversed, in the first modulation period and a second signal group including two-phase signals, relative phases of which are reversed, in the second modulation period, first position information in the first modulation period is detected from the first signal group, and second position information in the second modulation period is detected from the second signal group, and the second modulation period is an odd multiple of the first modulation period.

7 Claims, 14 Drawing Sheets

OPTICAL ENCODER

BACKGROUND OF THE INVENTION

1. Field of the Invention

The present invention relates to an optical encoder that detects a position, and more particularly, to an optical encoder that detects position information relating to a focus lens and a zoom lens included in a lens apparatus such as a still camera or a video camera.

2. Description of the Related Art

Conventionally, an encoder is used to detect a position of a machine tool or a factory automation (FA) apparatus. A position detection system for the encoder is roughly classified into an incremental system for measuring a relative movement distance and an absolute system for detecting an absolute position. The encoder using the incremental system has the advantage that its configuration may be simple while having disadvantages in that position information is lost when power thereto is turned off, and errors are accumulated by external noise. On the other hand, the encoder using the absolute system generally has the advantages that it is high in accuracy because no errors are accumulated and movement to a home position is not required even when power thereto is turned off.

The encoder using the absolute system for detecting an absolute position has a configuration illustrated in FIG. 14, for example, as discussed in Japanese Patent Application Laid-Open No. 2009-198318. According to this example, more information can be obtained from a small number of scale tracks by forming a plurality of modulations having different periods in a scale pattern on one track.

When analysis is performed based on a conventional example, an image received on a sensor surface via a scale including a plurality of modulation periods includes unnecessary spatial frequency components generated by interference between diffracted light beams and unnecessary spatial frequency components included in a transmittance distribution or a reflectance distribution in the scale. An error from an ideal sine wave occurs due to this effect. As a result, the error becomes a position detection error when the sine wave is converted into a position signal by an arc tangent operation.

SUMMARY OF THE INVENTION

The present invention is directed to an encoder capable of detecting a plurality of information from one track with high accuracy.

According to an aspect of the present invention, an optical encoder includes a light source, a displacement scale including a scale track having a transmittance distribution or a reflectance distribution including position information, and a light receiving element array configured to receive a light flux emitted from the light source and transmitted or reflected by the displacement scale, wherein the transmittance distribution or the reflectance distribution provided in the scale track has a first modulation period and a second modulation period in a scale displacement direction, wherein the light receiving element array is arranged to detect a first signal group including two-phase signals, relative phases of which are reversed, in the first modulation period and a second signal group including two-phase signals, relative phases of which are reversed, in the second modulation period, wherein first position information in the first modulation period is detected from the first signal group, and second position information in the second modulation period is detected from the second signal group, and wherein the second modulation period is an odd multiple of the first modulation period.

According to the above-mentioned configuration, unnecessary spatial frequency components generated by interference between diffracted light beams in an image received on a light receiving surface of the light receiving element array and unnecessary spatial frequency components included in the transmittance distribution or the reflectance distribution in the scale track can be reduced, and error components of a detected waveform can be reduced. Therefore, high-accuracy position detection is enabled.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
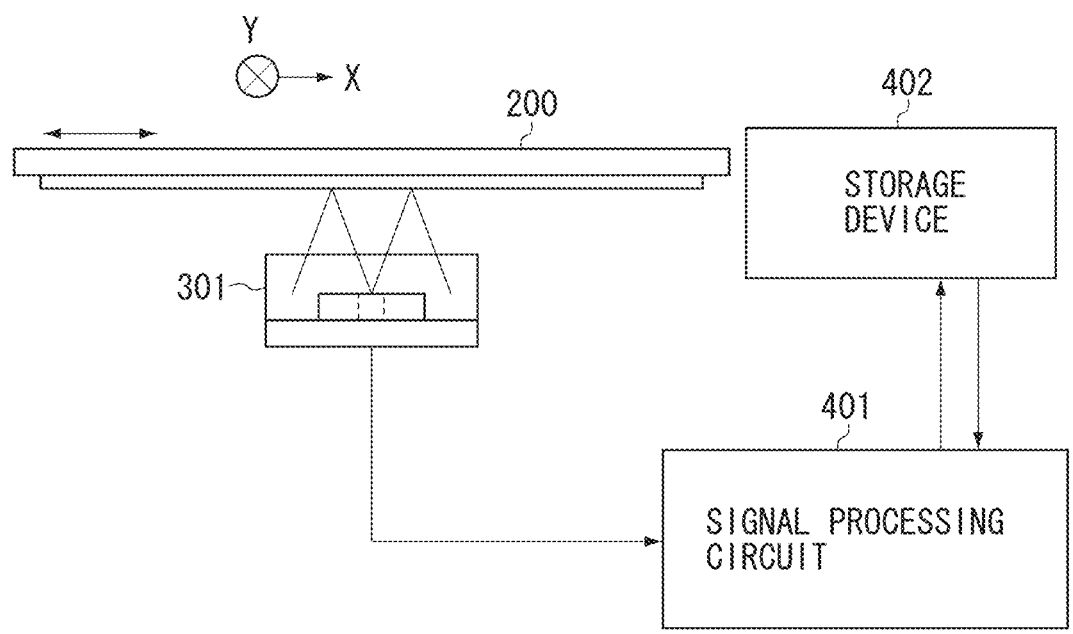
FIG. 1 is a schematic diagram illustrating a configuration of an optical encoder according to a first exemplary embodiment of the present invention.

FIG. 1 illustrates a configuration of an optical encoder according to a first exemplary embodiment of the present invention. The optical encoder includes a displacement scale 200 attached to a movable member, a sensor unit 301 attached to a fixed member, a signal processing circuit 401 serving as a control unit, and a storage device 402. The signal processing circuit 401 serving as the control unit performs interpolation processing of an encoder signal obtained from the sensor unit 301, writes and reads a signal to and from the storage device 402, and outputs a position signal.

Figure 2A:
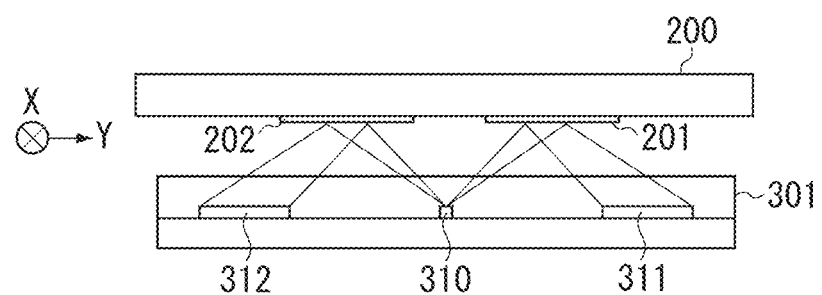
FIGS. 2A and 2B illustrate a configuration of a sensor unit 301 illustrated in FIG. 1.
Figure 2B:
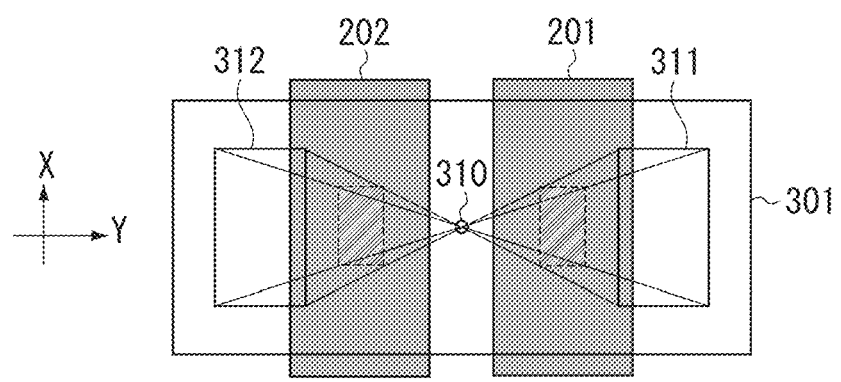

FIGS. 2A and 2B illustrate a configuration of the sensor unit 301, where FIG. 2A is a side view, and FIG. 2B is a top view.

The sensor unit 301 is an integrated light receiving and emitting sensor unit in which a light emitting diode (LED) 310 serving as a light source and photodiode arrays 311 and 312 serving as a light receiving element array are mounted in the same package. A displacement scale 200 has a chromium reflective film patterned as two slit tracks, i.e., first and second slit tracks 201 and 202 on its glass substrate.

The first track 201 and the second track 202 of the displacement scale 200 are irradiated with a divergent light flux emitted from the LED 310 in the sensor unit 301. Light beams reflected from the first track 201 and the second track 202 are respectively reflected toward the photodiode arrays 311 and 312 in the sensor unit 301. Reflectance distributions of the slit tracks 201 and 202 are respectively received as images that has been magnified two times (two-times magnified images) on the photodiode arrays 311 and 312.

More specifically, a light-dark pattern (a light-dark fringe pattern) is formed in the direction in which the scale is displaced on light receiving surfaces of the photodiode arrays 311 and 312.

A light flux irradiated onto an area having a chromium reflective film formed therein is reflected by the chromium reflective film and directed toward the photodiode arrays 311 and 312 (a light pattern). A light flux irradiated onto an area having no chromium reflective film formed therein is neither reflected nor directed toward the photodiode arrays 311 and 312 (a dark pattern).

Light fluxes received by the photodiode arrays 311 and 312 are respectively converted into electrical signals, and are fed as encoder signals to the signal processing circuit 401 illustrated in FIG. 1.

Figure 3:
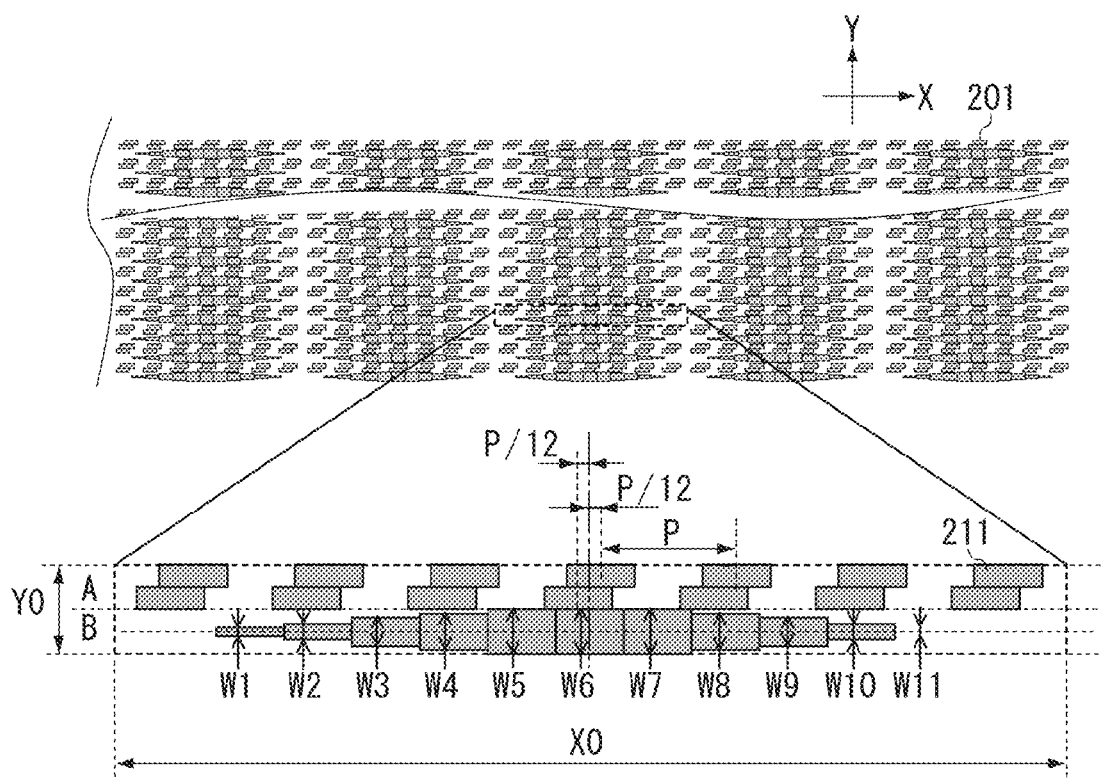
FIG. 3 is a plan view illustrating a configuration of a first track 201 in a scale 200 illustrated in FIGS. 2A and 2B.

FIG. 3 is an enlarged view of a part of the first track 201 of the displacement scale 200. The first track 201 has unit block patterns 211 periodically arranged therein in a movement direction (an X-axis direction) and a direction perpendicular to the movement direction (a Y-axis direction).

The movement direction (X-axis direction) of the unit block pattern 211 is defined as a scale displacement direction or a length measurement direction.

The unit block pattern 211 in the first track 201 has an X-axis direction width X0 of 700 µm and has a Y-axis direction width Y0 of 50 µm. The unit block pattern 211 includes an area (area A) including a row of first modulation patterns equally spaced for each pitch P of 100 µm with an X-axis direction width of 50 µm, and an area (area B) including a row of second modulation patterns having a period of 700 µm. Both Y-axis direction width of the area A serving as a first modulation period and the area B serving as a second modulation period are 25 µm.

The area A is further divided for each Y-axis direction width of 12.5 µm, and pattern rows are respectively shifted by ±(100/12) µm in the X-axis direction with respect to a central reference line of the unit block pattern 211. With such a configuration, an intensity distribution of a scale reflected image is integrated in a light receiving surface area so that a triple frequency component having a frequency of 100 µm is canceled, and a difference from an ideal sine wave is suppressed.

While measures against only the triple frequency component are taken in the present exemplary embodiment, the present invention is not limited to this. A multistage shift or a continuous shift may be made to cancel other frequency components.

In the area B, 11 reflection patterns having an X-axis direction width of 50 µm are arranged. Y-axis direction widths of the reflection patterns W1, W2, W3, W4, W5, W6, W7, W8, W9, W10, and W11 are respectively 5 µm, 9 µm, 16 µm, 20 µm, 25 µm, 25 µm, 25 µm, 20 µm, 16 µm, 9 µm, and 5 µm.

Similarly, a unit block pattern having position information relating to a displacement scale in the second track 202 has an X-axis direction width X0 of 714.58333 µm and a Y-axis direction width Y0 of 50 µm. The unit block pattern includes an area (area A) including a row of first modulation patterns having first position information equally spaced for each pitch P of 102.08333 µm with an X-axis direction width of 51.041667 µm, and an area (area B) including a row of second modulation patterns having second position information having a period of 714.58333 µm. Both the Y-axis direction widths of the area A serving as a first modulation period and the area B serving as a second modulation period are 25 µm.

The area A is further divided for each Y-axis direction width of 12.5 µm, and pattern rows are respectively shifted by ±(102.08333/12) µm in the X-axis direction with respect to a reference line.

In the area B, 11 reflection patterns having an X-axis direction width of 51.041667 µm are arranged. Y-axis direction widths of the reflection patterns W1, W2, W3, W4, W5, W6, W7, W8, W9, W10, and W11 are respectively 5 µm, 9 µm, 16 µm, 20 µm, 25 µm, 25 µm, 25 µm, 20 µm, 16 µm, 9 µm, and 5 µm.

Figure 4:
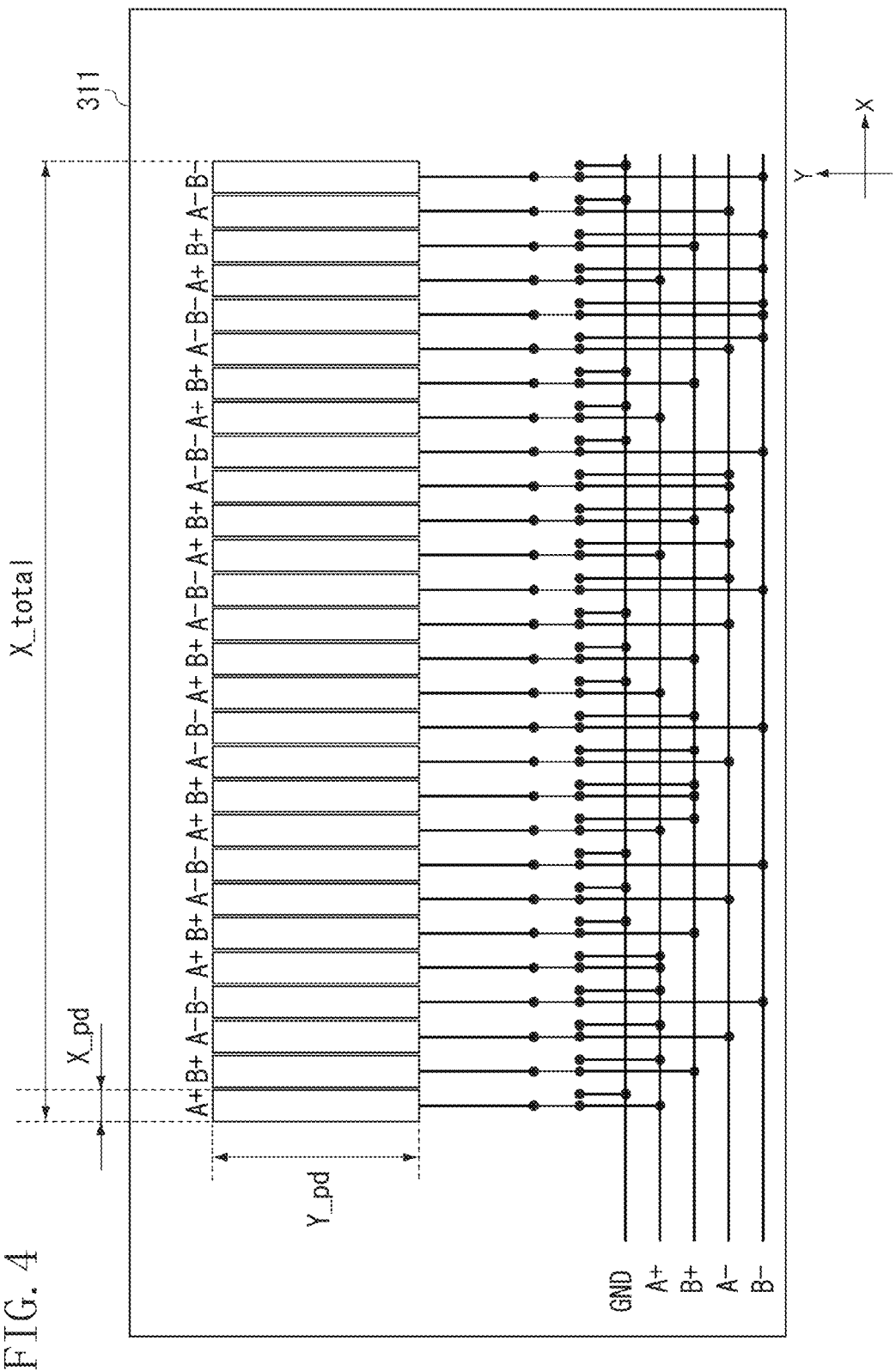
FIG. 4 is a plan view illustrating an arrangement of a photodiode array on a light receiving surface during detection of a first signal group in the first exemplary embodiment.
Figure 5:
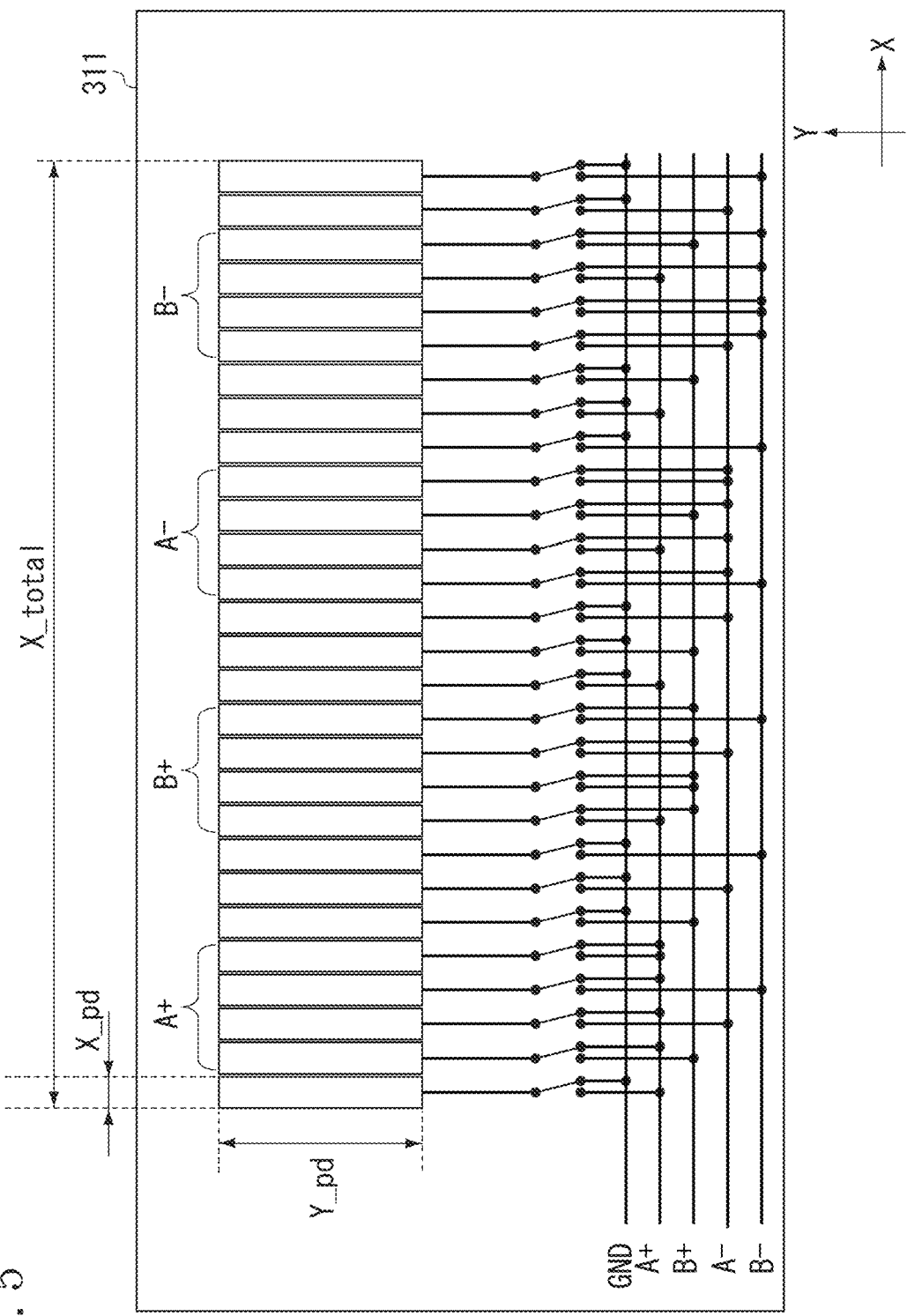
FIG. 5 is a plan view illustrating an arrangement of a photodiode array on a light receiving surface during detection of a second signal group in the first exemplary embodiment.

FIGS. 4 and 5 illustrate an arrangement of the photodiode array 311 on the light receiving surface. An output signal of the encoder will be described below.

The configuration of the photodiode array 312 is similar to the photodiode array 311. The photodiode array 311 has 28 photodiodes arranged therein at a pitch of 50 µm in the X-axis direction. One of the photodiodes has an X-axis direction width $X_{13}$ pd of 50 µm, and has a Y-axis direction width Y_pd of 800 µm. The total width X_total of the photodiode array 311 is 1400 µm (50×28).

An output from each of the photodiodes is electrically connected to four current-to-voltage (IV) conversion amplifiers of subsequent stage via a switch circuit. Outputs from the four IV conversion amplifiers respectively correspond to four-phase sinusoidal outputs S (A+), S (B+), S (A−), and S (B−). The switch circuit can switch electrical connection in a time sequential manner by an input from the exterior.

If the input is at a high level, a detection pitch with a scale pattern is 100 µm (a reflected image period of 200 µm), as illustrated in FIG. 4. If the input is at a low level, a detection pitch with a scale pattern is 700 µm (a reflected image period of 1400 µm), as illustrated in FIG. 5.

A combination of first electrical connections and a combination of second electrical connections are switched in a time sequential manner so that a light receiving surface and a peripheral circuit can be simplified by using the same configuration.

In the present exemplary embodiment, one continuous cumulative array area in the combination of the second electrical connections is equal to a width on the light receiving surface corresponding to the first modulation period of the light receiving element array. More specifically, at the detection pitch of 700 µm, four adjacent photodiodes are electrically connected to one another. Thus, a width of 200 µm, which matches the reflected image period of a modulation component having a period of 100 µm in the scale pattern, is integrated. Therefore, an effect of the modulation component having a period of 100 μm on the output can be reduced.

In the present exemplary embodiment, the total width of the light receiving element array included in the combination of the first electrical connections is an integral multiple of a detection pitch at which the second modulation period is read.

More specifically, at the detection pitch of 100 μm, the total width of the photodiodes relating to the signal is 1400 μm, which matches the reflected image period of a modulation component having a period of 700 μm. Therefore, an effect of the modulation component having a period of 700 μm on a variation in output amplitude can be reduced.

More specifically, the light receiving element arrays 311 and 312 are controlled so that the combination of the first electrical connections for detecting the first position information in the first modulation period, and the combination of the second electrical connections for detecting the second position information in the second modulation period, are switched. A first signal group is detected by the combination of the first electrical connections (see FIG. 4), and a second signal group is detected by the combination of the second electrical connections (see FIG. 5).

The four-phase sine wave outputs S (A+), S (B+), S (A−), and S (B−) have such a relationships for each of the detection pitches that relative phases of S (B+), S (A−), and S (B−) are respectively shifted by approximately +90 degrees, +180 degrees, and +270 degrees from a relative phase of S (A+). The signal processing circuit 401 performs the following operations for the outputs, to generate two-phase sinusoidal signals S (A) and S (B) from which direct current components have been removed, and an arc tangent operation is further performed on the signals, to obtain phase signals.

$$S(A)=S(A+)-S(A-)$$

$$S(B)=S(B+)-S(B-)$$

The light receiving element array is arranged to detect a first signal group including two-phase signals S (A+) and S (A−) relative phases of which are reversed in the first modulation period and a second signal group including two-phase signals S (B+) and S (B−) relative phases of which are reversed in the second modulation period.

The arc tangent operation means an operation for calculating, from two sine waves the relative phases of which are shifted by 90 degrees, i.e., a SIN wave and a COS wave, the phases.

In the present exemplary embodiment, the total width of the light receiving element array included in the combination of the first electrical connections is an integral multiple of a detection pitch at which the second modulation period is read.

Figure 6:
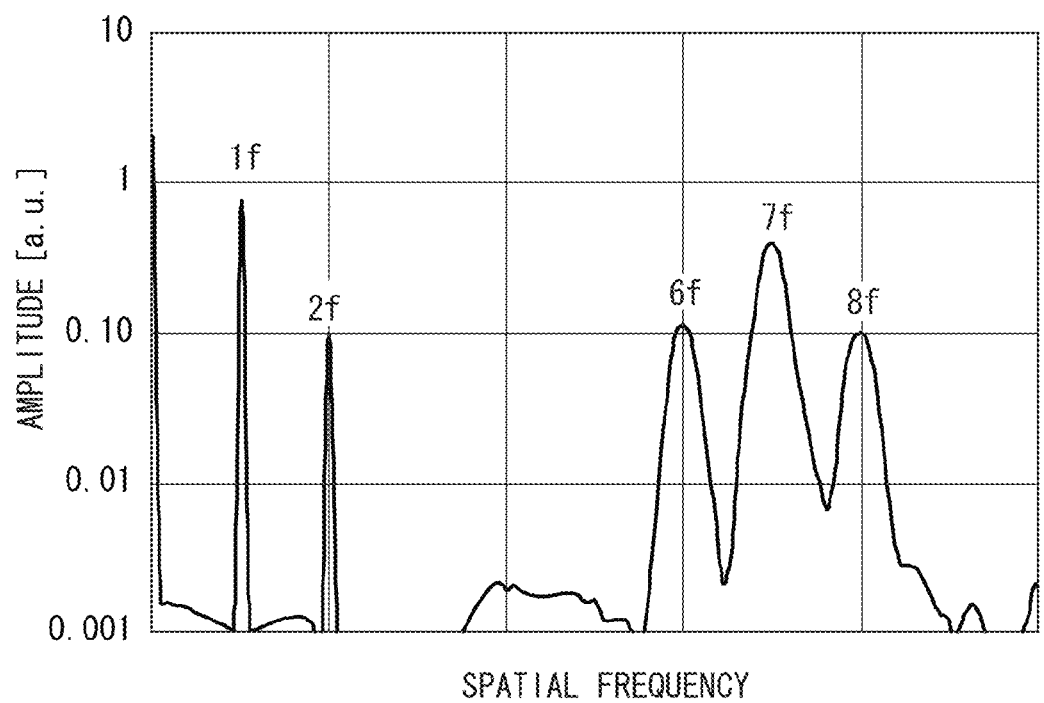
FIG. 6 illustrates spatial frequency components included in a reflected diffraction image from a scale in the first exemplary embodiment.

FIG. 6 illustrates spatial frequency components included in a reflected diffraction image from the scale. Unnecessary spatial frequency components $2f$, $6f$, and $8f$ are generated by interference between diffracted light beams in addition to a spatial frequency component $1f$ of a two-times magnified image having a period of 700 μm and a spatial frequency component $7f$ of a two-times magnified image having a period of 100 μm.

Figure 7:
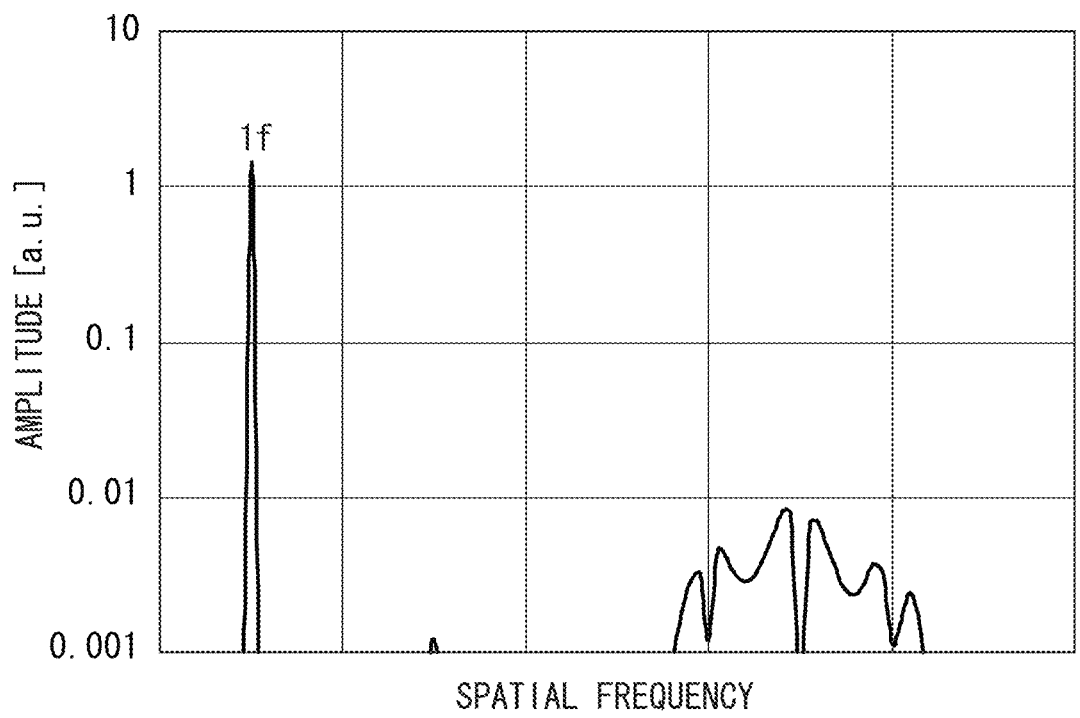
FIG. 7 illustrates a harmonic component included in a sinusoidal signal S (A) in the first exemplary embodiment.

FIG. 7 illustrates a calculation result of a harmonic component included in a sinusoidal signal S (A) generated when the reflected diffraction image is detected at a detection pitch of 700 μm. Four adjacent photodiodes are integrated so that a frequency component $7f$ is suppressed. Further, frequency components $2f$, $6f$, and $8f$ are canceled by an operation of S (A+)−S (A−). As a result, unnecessary spatial frequency components are reduced, and a substantially ideal sine wave is obtained.

A mechanism of generating each frequency component will be described. A spatial frequency of an interference fringe due to interference between diffracted light beams is determined by a difference between diffraction angles of the diffracted light beams that interfere with each other. A spatial frequency component $1f$ is generated by interference between a zero-order light beam and ±primary diffracted light beams with a coarse period.

A spatial frequency component $7f$ is generated by interference between a zero-order light beam and ±primary diffracted light beams with a fine period. A spatial frequency component $2f$ is generated by interference between ±primary diffracted light beams with a coarse period.

A spatial frequency component $6f$ is generated by interference between a +primary (−primary) diffracted light beam with a fine period and a +primary (−primary) diffracted light beam with a coarse period. The spatial frequency component $8f$ is generated by interference between a +primary (−primary) diffracted light beam with a fine period and a −primary (+primary) diffracted light beam with a coarse period.

Thus, unnecessary frequency components to be an error factor of sine wave interpolation processing are generated as spatial frequency components corresponding to the sum and the difference between spatial frequencies of two-times magnified images having a fine period and a coarse period.

In the present exemplary embodiment, the finer first modulation period (fine period) is an odd multiple of the coarse second modulation period (coarse period) so that unnecessary spatial frequency components included in a reflected diffraction image can be an even harmonic component of the coarser spatial frequency component. Thus, the unnecessary spatial frequency components can be collectively canceled by a differential operation in the subsequent stage.

While the fine modulation period (fine period) is seven times the coarse modulation period (coarse period) in the present exemplary embodiment, it may be five times, nine times, or the like if it is an odd multiple of 2n+1 (n: a natural number), to obtain a similar effect.

A procedure for detecting an absolute position will be described below.

A phase signal φ1 in the first track 201 and a phase signal φ2 in the second track 202, which are generated when an input to the switch circuit is at a high level (a detection pitch of 100 μm) and a phase signal φ1' in the first track 201 and a phase signal φ2' in the second track 202, which are generated when the input to the switch circuit is at a low level (a detection pitch of 700 μm) can be acquired by acquiring the signals immediately after switching of the input to the switch circuit so that the phase signals φ1, φ2, φ1', and φ2' at the same position can be obtained.

While the displacement scale 200 is moving at high speed, synchronism is reduced. However, in the case, synchronism may be ensured by performing acquisition a plurality of numbers of times to obtain an average of phases. More specifically, sine wave outputs S (A+), S (A−), S (B+), and S (B−) are acquired at a detection pitch of 100 μm, and the input to the switch circuit is switched from a high level to a low level.

The sine wave outputs S (A+), S (A−), S (B+), and S (B−) are then acquired at a detection pitch of 700 μm, the input to the switch circuit is switched from a low level to a high level, and the sine wave outputs S (A+), S (A−), S (B+), and S (B−) are acquired again at a detection pitch of 100 μm. Intervals between the respective acquisition timings are made substantially constant. Synchronism between the first phase signals φ1 and φ2 and the second phase signals φ1' and φ2', which are thus calculated, can be improved by taking first and second averages between the phase signals φ1 and φ2.

Phase signals P1, P2, P3, and P4 having different periods are generated by the following operations from the phase signals φ1, φ2, φ1', and φ2'.

$$P1=\phi1'-\phi2'$$

$$P2=\phi1-\phi2$$

$$P3=\phi1'$$

$$P4=\phi1$$

Figure 8:
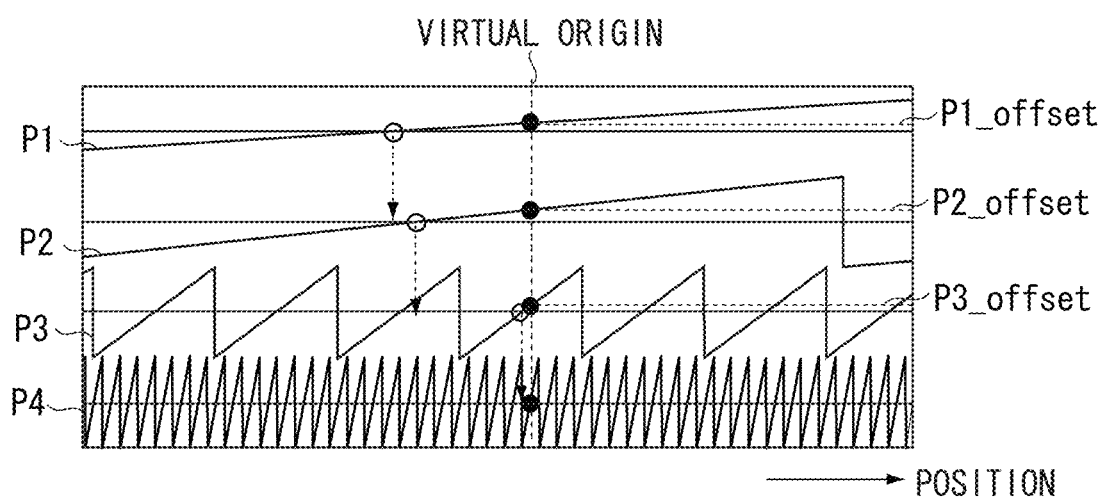
FIG. 8 illustrates an initialization operation of the optical encoder according to the first exemplary embodiment.

Referring to FIG. 8, a procedure for an initialization operation in the present exemplary embodiment, will be described.

First, the displacement scale 200 is moved in a predetermined direction. The first zero-cross of the phase signal P2 after passage of a zero-cross of the phase signal P1 is detected, the first zero-cross of the phase signal P3 immediately thereafter is detected, and the first zero-cross of the phase signal P4 immediately thereafter is further detected. The zero-cross of the phase signal P4 is set to a virtual origin.

During the initialization operation, the signal processing circuit 401 serving as a control unit writes the phase signals P1, P2, and P3 at the virtual origin, i.e., P1_offset, P2_offset, and P3_offset into the storage device 402. The initialization processing may be performed at any timing in addition to a shipment time of the encoder, for example.

A procedure for synthesizing an absolute position signal from period signals will be described below. Intermediate signals Q1 and Q2 are first acquired by the following operations:

$$Q1=\text{Round}[(P1-P1\_\text{offset})-(P2-P2\_\text{offset})/7]+(P2-P2\_\text{offset})/7$$

$$Q2=\text{Round}[Q1-(P3-P3\_\text{offset})/49]+(P3-P3\_\text{offset})/49$$

wherein Round [ ] is a function for performing round-off processing.

An absolute position signal S_abs is then acquired as follows.

$$S\_\text{abs}=\text{Round}[Q2-P4/343]+P4/343$$

The absolute position signal S_abs thus obtained is output from the signal processing circuit 401.

While a linear scale is employed as an example in the present exemplary embodiment, a rotary scale may be used to obtain a similar effect. While a plurality of detection pitches is realized by switching a combination of light receiving surfaces to be integrated in a time sequential manner in the present exemplary embodiment, the light receiving surfaces respectively corresponding to the detection pitches may be separately provided.

While an arc tangent operation based on a SIN wave and a COS wave is performed, to generate phase signals in the present exemplary embodiment, the present invention is not limited to this. For example, three-phase sine waves, which are out of phase with one another by 120 degrees, for example, may be respectively generated by differential operations, to perform phase detection.

Other combinations of light receiving surfaces may be used if sinusoidal signals are respectively obtained by differential operations of inverted phase signals.

As described above, the optical encoder according to the present exemplary embodiment enables, when a plurality of period signals formed on one track is detected, high-accuracy position detection, because a waveform close to a sine wave is also obtained from any one of the period signals.

While the reflection type scale having a reflectance distribution including the position information according to the present exemplary embodiment utilizes a difference between reflectances on reflectors, the present invention is not limited to this.

While the reflection type displacement scale 200 according to the present exemplary embodiment has a chromium reflective film formed in its desired reflective area to be measured and observed, the present invention is not limited to this.

As a configuration of the reflector, an aluminum reflective film or a metal reflective member may be used for a desired reflective area to be measured and observed. Alternatively, a surface of the reflective area maybe a mirror surface, while a surface of a non-reflective area may be roughened to be a diffusion surface.

While the scale tracks 201 and 202 are of a reflection type having a reflectance distribution including position information in the present exemplary embodiment, the present invention is not limited to this.

The scale tracks according to the present invention may be of a transmission type having a transmittance distribution including position information.

A second exemplary embodiment is similar to the first exemplary embodiment in a configuration other than a pattern of a linear displacement scale, and the description of other configurations and signal processing are not repeated.

Light receiving element arrays 311 and 312 in the present exemplary embodiment are also arranged to detect a first signal group including two-phase signals S (A+) and S (A−) relative phases of which are reversed with each other in a first modulation period, and a second signal group including two-phase signals S (B+) and S (B−) relative phases of which are reversed in a second modulation period.

Figure 9:
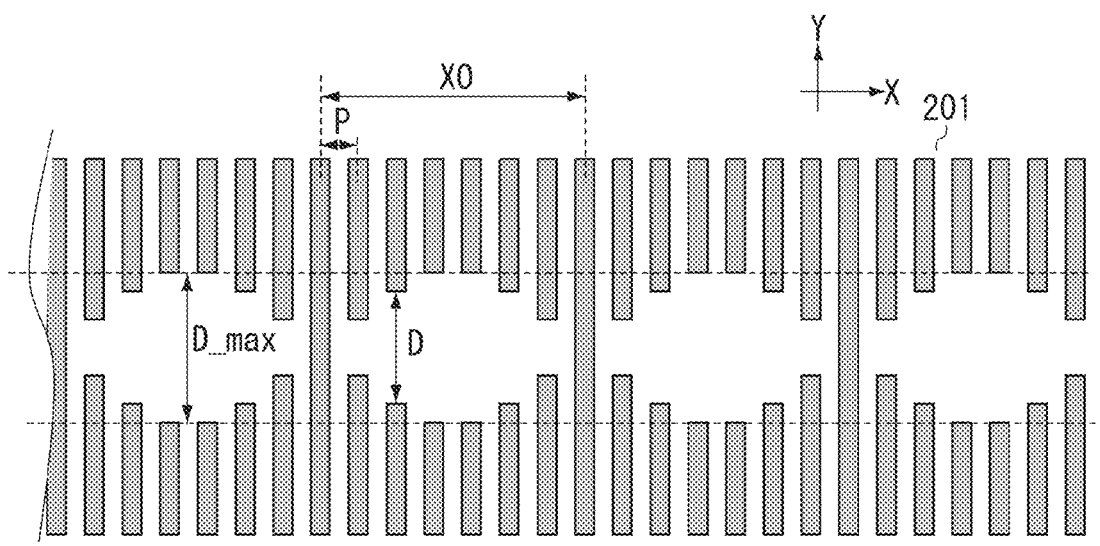
FIG. 9 illustrates a pattern of a scale according to a second exemplary embodiment.

FIG. 9 illustrates a scale pattern according to the second exemplary embodiment. A first track 201 has reflective film slits equally spaced for each pitch P of 100 μm with an X-axis direction width of 50 μm. The first track 201 has an area having no reflective film slits at its center. A distance D between the reflective film slits is modulated for every seven reflective film slits (a modulation period X0). The maximum distance D_max is 200 μm, and the minimum distance is 0 μm.

A second track 202 has reflective film slits equally spaced for each pitch P of 102.08333 μm with an X-axis direction width of 51.041667 μm. The second track 202 has an area having no reflective film slits at its center, similarly to the first track 201. A distance D between the reflective film slits is modulated for every seven reflective film slits. The sensor unit 301 is positioned to always read a range including the maximum distance D_max. The remaining two distances are respectively 39.6 μm and 128.6 μm.

Four-phase sinusoidal outputs, which are detected at a detection pitch of 700 μm include frequency components $6f$, $7f$, and $8f$ in addition to a frequency component $if$ (a period of 700 μm). Four adjacent photodiodes are integrated so that the frequency component $7f$ is suppressed. Further, the frequency components $6f$ and $8f$ are canceled by an operation of S (A+)−S (A−). As a result, a sinusoidal output, a harmonic wave of which has been suppressed, can be obtained, like that in the first exemplary embodiment.

A mechanism of generating each of the frequency components will be described. A reflection pattern of the scale appears in a signal as an amplitude modulation having a fine period modulated with a coarse modulation period, considering a cumulative effect in a reading range by a light receiving width of a photodiode. More specifically, frequency components $7f+1f$ and $7f+1f$ are generated.

Therefore, the fine first modulation period (fine period) is an odd multiple of the coarse second modulation period (coarse period) so that unnecessary spatial frequency components included in a reflected diffraction image can be an even harmonic component of the coarse spatial frequency component. Thus, the unnecessary spatial frequency components can be collectively canceled by a differential operation in the subsequent stage, like in the first exemplary embodiment.

While the fine first modulation period (fine period) is seven times the coarse second modulation period (coarse period) in the present exemplary embodiment, it may be five times, nine times, or the like if it is an odd multiple of 2n+1 (n: a natural number).

Figure 10:
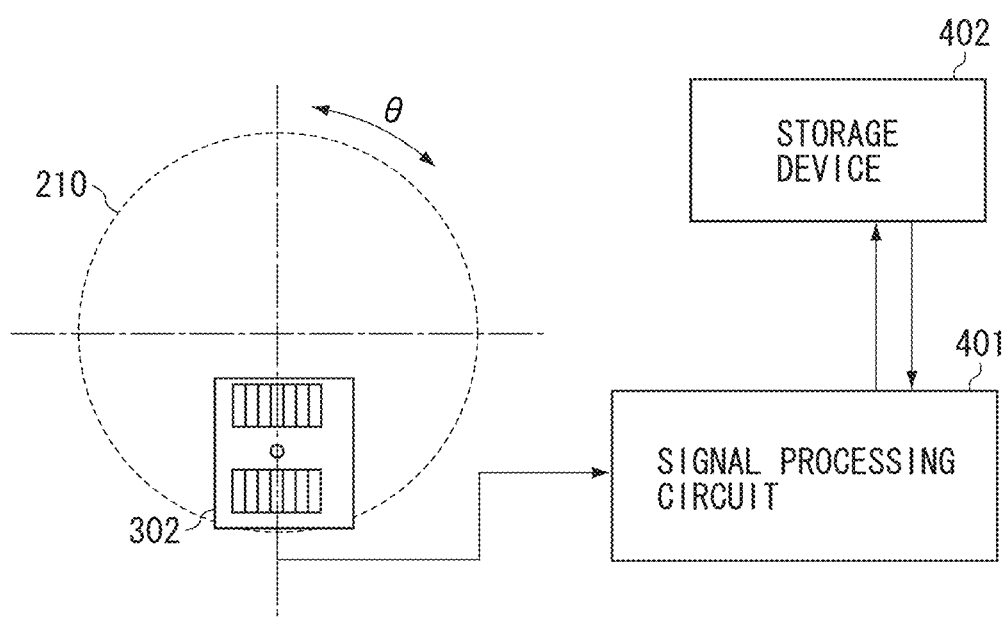
FIG. 10 is a schematic diagram illustrating a configuration of a rotary type optical encoder according to a third exemplary embodiment of the present invention.

FIG. 10 illustrates a configuration of a rotary type optical encoder according to a third exemplary embodiment.

The rotary type optical encoder includes a rotary displacement scale 210 attached to a rotary movable member, a sensor unit 302 attached to a fixed member, a signal processing circuit 401, and a storage unit 402. The signal processing circuit 401 performs interpolation processing of an encoder signal obtained by the sensor unit 302, writes and reads a signal to and from the storage device 402, and outputs a position signal.

Figure 11:
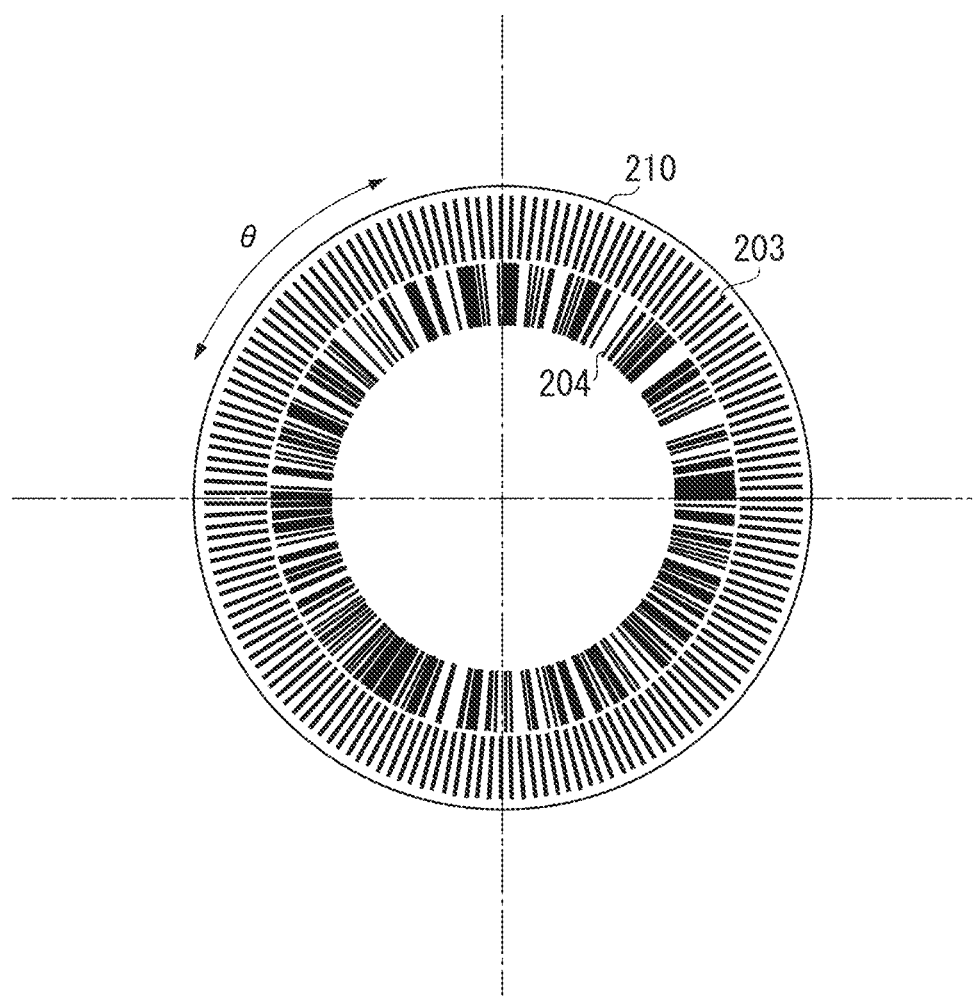
FIG. 11 illustrates a track configuration of a rotary displacement scale 210 according to the third exemplary embodiment of the present invention.

FIG. 11 illustrates a track configuration of the rotary displacement scale 210 in the third exemplary embodiment. The rotary displacement scale 210 includes a maximal length (M) sequence track 204 including an M sequence pattern having position information relating to the displacement scale 210 and a radial track 203 having position information relating to the displacement scale 210.

Figure 12:
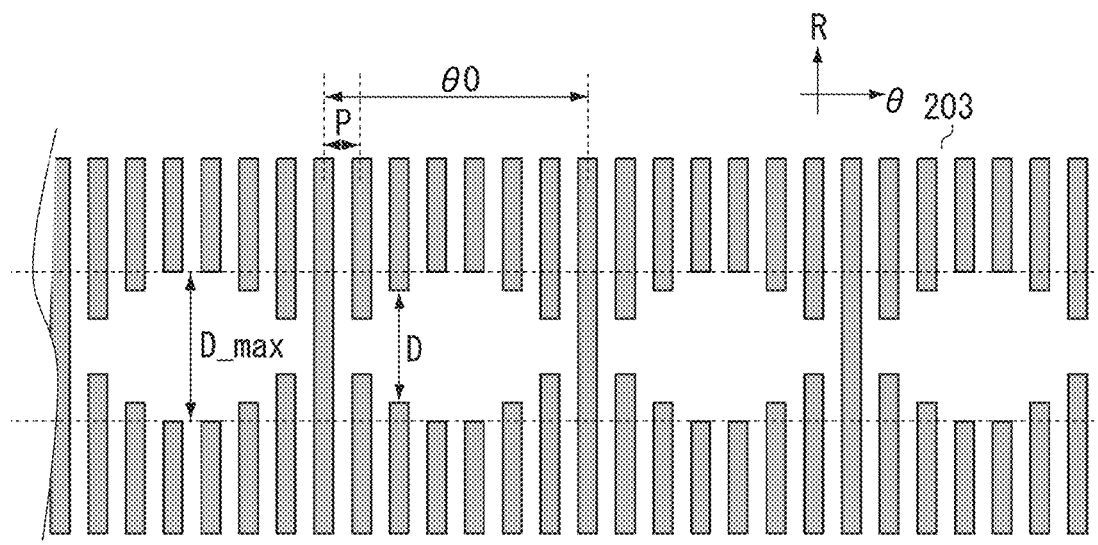
FIG. 12 is an enlarged view of a part of a radial track 211.

FIG. 12 is an enlarged view of a part of the radial track 203.

The radial track 203 has reflective film slits arranged therein at equiangular spacing P. The radial track 203 has an area having no reflective film at its center. A distance D between the reflective film slits is modulated every seven reflective film slits (a modulation period θ0). The maximum distance D_max is 200 μm, and the minimum distance is 0 μm. The sensor unit 302 is positioned to always read a range including the maximum distance D_max. The remaining two distances are respectively 39.6 μm and 128.6 μm.

Figure 13A:
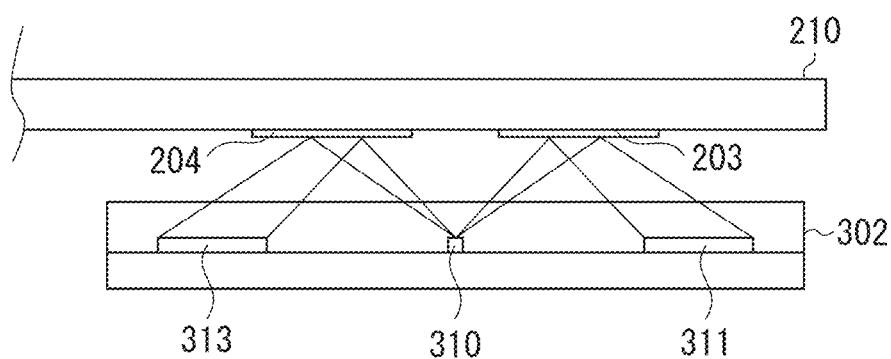
FIGS. 13A and 13B illustrate a configuration of a sensor unit 302 illustrated in FIG. 10.
Figure 13B:
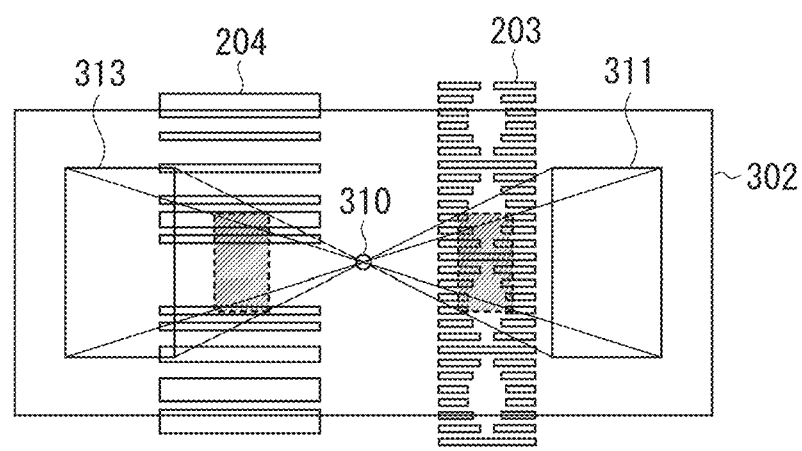
Figure 14:
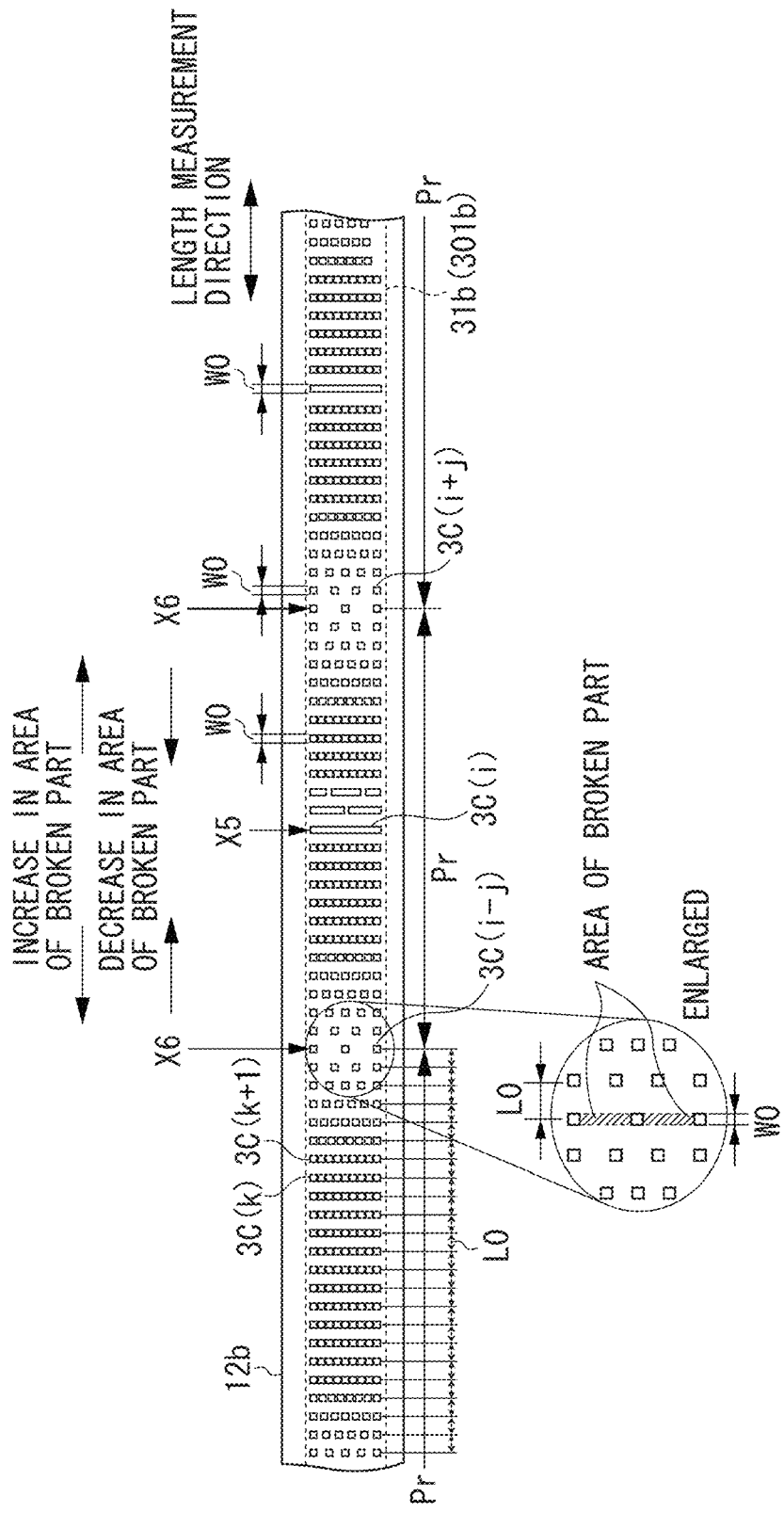
FIG. 14 illustrates a conventional technique.

FIGS. 13A and 13B illustrate a configuration of the sensor unit 302, where FIG. 13A is a side view, and FIG. 13B is a top view.

The sensor unit 302 is an integrated light receiving and emitting sensor unit in which an LED 310 serving as a light source, a photodiode array 311, and an M sequence photodiode array 313 are mounted in the same package. The radial track 203 and the M sequence track 204 in the rotary displacement scale 210 are respectively irradiated with divergent light fluxes emitted from the LED 310 in the sensor unit 302.

Light fluxes reflected from the radial track 203 and the M sequence track 204 are respectively reflected toward the photodiode array 311 serving as a light receiving element array and the M sequence photodiode array 313 serving as a light receiving element array in the sensor unit 302. Reflectance distributions in the radial track 203 and the M sequence track 204 are respectively received as two-times magnified images on the photodiode array 311 and the M sequence photodiode array 313.

The M sequence photodiode array 313 has photodiodes having a width corresponding to the two-times magnified image having the minimum line width of an M sequence arranged therein so that it can detect the M sequence. Light fluxes received by the photodiode array 311 and the M sequence photodiode array 313 are respectively converted into electrical signals, and are sent as encoder signals to the signal processing circuit 401 illustrated in FIG. 1.

A high-order signal P1 is acquired from the reflected light flux from the M sequence track 204. A phase signal φ1' in the radial track 203 generated when an input to a switch circuit is at a low level (a detection pitch of 700 μm) is acquired as a middle-order signal P2. A phase signal φ1 in the radial track 203 generated when the input to the switch circuit is at a high level (a detection pitch of 100 μm) is acquired as a low-order signal P3. A procedure for acquiring an absolute position signal from the signals P1, P2, and P3 is similar to that in the first exemplary embodiment 1, and hence the description thereof is not repeated.

A request for absolute position detection accuracy obtained by the M sequence track 204 is mitigated by generating the middle-order signal P2 so that the absolute position signal is easily synthesized. In the present exemplary embodiment, position detection at a pitch of approximately 700 μm in a circumferential direction is sufficient. Even if the rotary displacement scale 210 is decentered by several ten micrometers around a rotation center, for example, the effect can be permitted.

As described above, even in the rotary displacement scale 210, a middle-order signal and a low-order signal having few interpolation errors can also be generated by a similar effect to that in the first exemplary embodiment, so that high-accuracy position detection is enabled.

While the radial track 203 and the M sequence track 204 are of a reflection type having a reflectance distribution including position information in the present exemplary embodiment, the present invention is not limited to this.

The radial track 203 and the M sequence track 204 in the present exemplary embodiment may be of a transmission type having a transmittance distribution including position information.

The optical encoder according to the present invention is used to detect position information relating to a focus lens and position information relating to a zoom lens, which are included in lens apparatuses such as a still camera and a video camera.

The optical encoder according to the present invention can be used to detect position information relating to a linear displacement scale or a rotary displacement scale, which are included in a laser beam printer and a copying machine using an electrophotographic process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-163185 filed Jul. 20, 2010, which is hereby incorporated by reference herein in its entirety.

What is claimed is:

1. An optical encoder comprising:
   a light source,
   a displacement scale including a scale track having a transmittance distribution or a reflectance distribution including position information, and
   a light receiving element array configured to receive a light flux emitted from the light source and transmitted or reflected by the displacement scale,
   wherein the scale track includes a first part having a first modulation period and a second part having a second modulation period in a scale displacement direction of the displacement scale,
   wherein the light receiving element array is formed of a plurality of light receiving elements one-dimensionally arranged in the scale displacement direction of the displacement scale, the light receiving elements each configured to receive both light from the first part and light from the second part, wherein the light receiving element array is arranged to detect a first signal group including two-phase signals, relative phases of which are reversed, in the first modulation period and a second signal group including two-phase signals, relative phases of which are reversed, in the second modulation period, wherein first position information in the first modulation period is detected from the first signal group, and second position information in the second modulation period is detected from the second signal group, and wherein the second modulation period is an odd multiple of the first modulation period.

2. The optical encoder according to claim 1, wherein the light receiving element array is controlled so that a combination of first electrical connections for detecting the first position information in the first modulation period and a combination of second electrical connections for detecting the second position information in the second modulation period, wherein the first signal group is detected by the combination of the first electrical connections, and the second signal group is detected by the combination of the second electrical connections.

3. The optical encoder according to claim 1, wherein one continuous cumulative array area in the combination of the second electrical connections is equal to a width on a light receiving surface corresponding to the first modulation period of the light receiving element array.

4. The optical encoder according to claim 1, wherein the total width of the light receiving element array included in the combination of the first electrical connections is an integral multiple of a detection pitch at which the second modulation period is read.

5. A lens apparatus comprising: an optical encoder according to claims 1, wherein the optical encoder detects position information relating to a focus lens or a zoom lens.

6. The optical encoder according to claim 1, wherein the light receiving element array includes a plurality of first parts and a plurality of second parts, and wherein the plurality of first parts and the plurality of second parts are alternately arranged in a direction perpendicular to the scale displacement direction.

7. The optical encoder according to claim 1, wherein one light receiving element of the light receiving element array is configured to receive light from the plurality of first parts and the plurality of second parts.

* * * * *